Patented May 6, 1924.

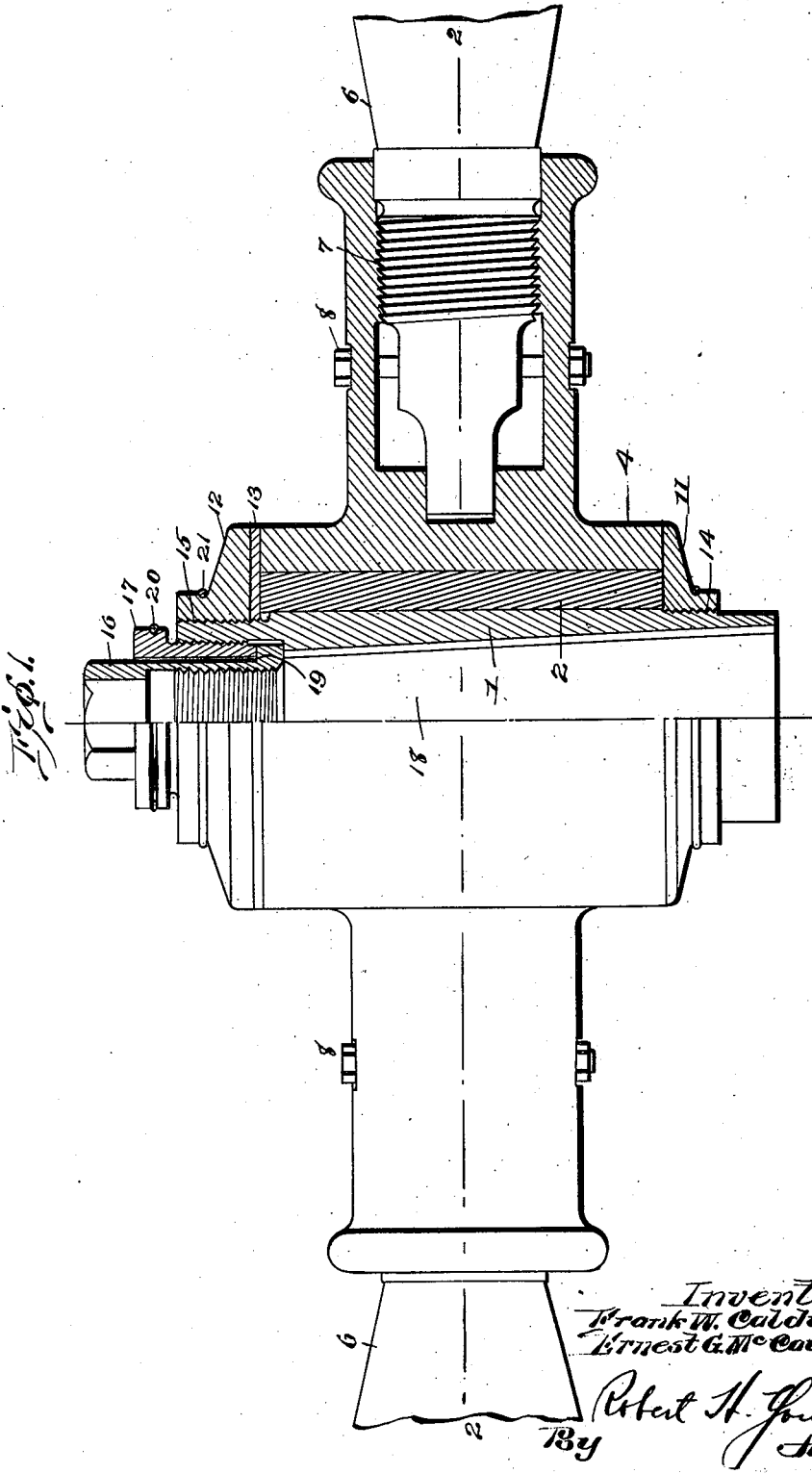

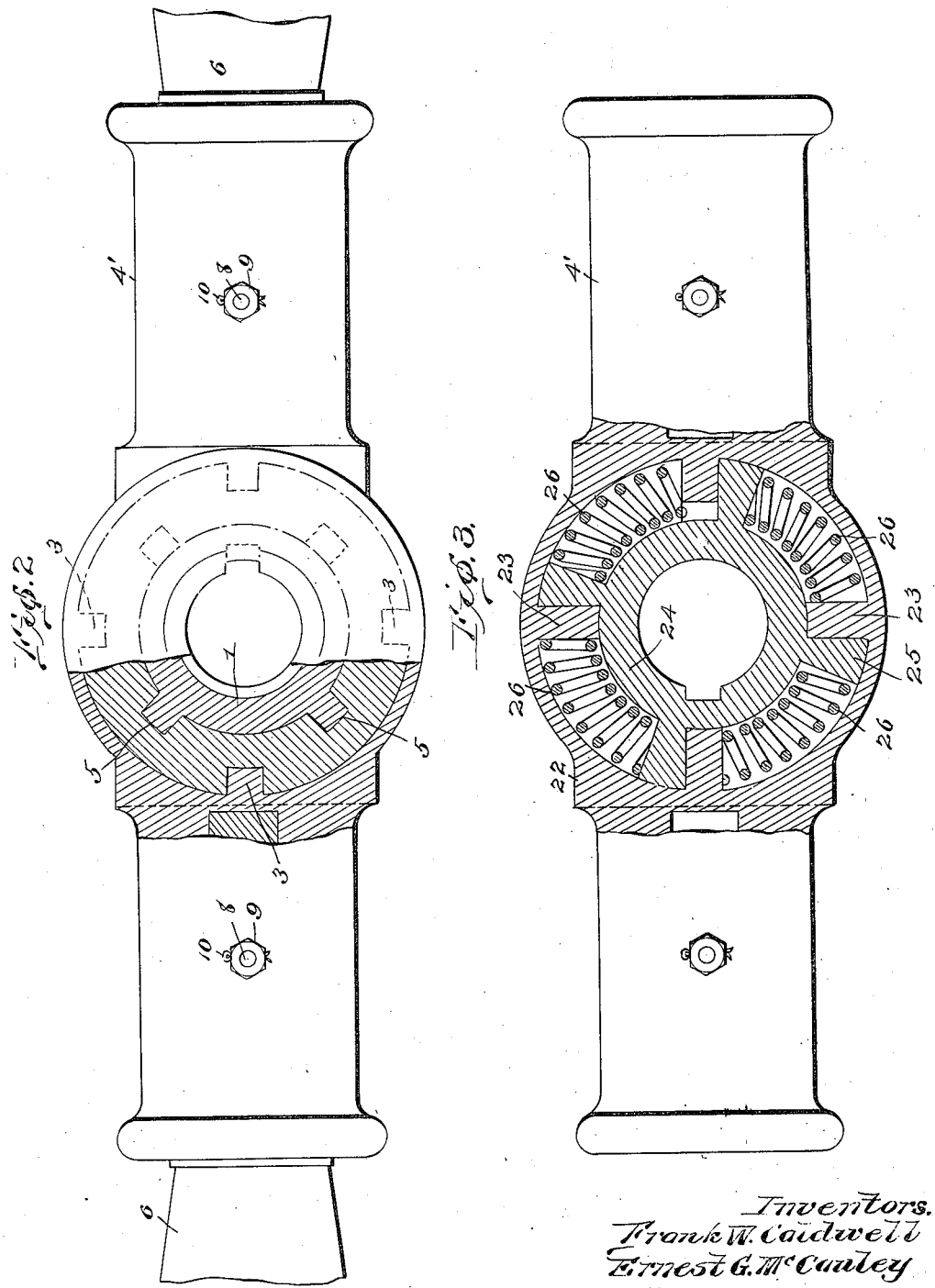

1,493,066

UNITED STATES PATENT OFFICE.

FRANK W. CALDWELL AND ERNEST G. McCAULEY, OF DAYTON, OHIO.

AIRCRAFT PROPELLER.

Application filed April 18, 1922. Serial No. 554,405.

*To all whom it may concern:*

Be it known that we, FRANK W. CALDWELL and ERNEST G. McCAULEY, citizens of the United States, residing at Dayton, in the county of Montgomery and State of Ohio, have invented certain new and useful Improvements in Aircraft Propellers, of which the following is a specification.

The object of this invention is to provide improvements in the art of propellers, especially adapted for use in aircraft, and principally in the construction of same in order to provide a method for relieving the strains set up in the hub, caused by a hammering effect of the engine on the hub due to the uneven and unbalanced inertia forces set up by the engine and its shaft in revolving the propeller.

These unbalanced inertia forces cause the propeller to receive an uneven source of power and these impulses from the engine cause a jerking effect on the propeller, thereby having a tendency to shear the driving keys provided between the engine shaft and the propeller hub.

While in the case of a propeller provided with detachable blades, the constant hammering effect causes the blades to become loose in their mountings in the hub member and thereby throw the propeller out of balance, which when run at high speed would cause the complete destruction of the engine and probably cause other serious consequences.

In some of the present types of engines, especially those of the eight-cylinder type, it seems impossible to properly balance these inertia forces, and for this purpose it is proposed to provide a propeller with resilient means for absorbing the hammering effect of these unbalanced inertia forces of the engine, in such a manner as to provide a flexible mounting between the engine and the propeller hub in such a way as to cause the torque of the blades to act against the resilient means provided in the hub and likewise counteract the unbalanced inertia forces from the engine.

In designing a propeller of this type, an advantage is gained by using detachable blades, due to the fact that a blade may be readily replaced and balanced, thereby prolonging the life of the propeller in service. Also by using a detachable shaft plug, it is possible to provide the propeller with suitable bored shaft plugs that would be adapted to fit any type of engine shaft.

With the foregoing and other objects in view, which shall appear as the description proceeds, the invention resides in the combination of parts and in the details of construction hereinafter described, illustrated and claimed.

Figure 1 is a horizontal section taken through the hub assembly of the propeller.

Figure 2 is a section taken along line 2—2 of Figure 1.

Figure 3 is a horizontal section taken through the hub assembly, showing a modified form of shock absorbing means provided between the shaft plug and the hub of the propeller.

Referring more particularly to the drawings, numeral 1 represents a hollow tapered bored engine shaft plug, provided with a plurality of integral splines 5, preferably four in number. Surrounding the shaft plug 1 is a hub 4 having integral reduced extensions 4' screw-threaded interiorly at 7 to receive propeller blades 6 which are further secured in the hub by means of a bolt 8 passing through the hub and blade and locked by a nut 9 safetied by a cotter key 10.

The hub 4 is further provided with splines 3, preferably four in number. Intermediate the shaft plug and hub 4 is arranged a cylindrical layer of tough elastic material 2, such as a phenol condensation product consisting of layers of cloth or canvas impregnated with bakelite, and molded into a solid mass. This member 2 is provided with radial grooves to receive the splines 3 and 5 of the hub 4 and shaft plug 1 respectively.

The member 2 should be of such material having characteristics of toughness, elasticity and resiliency; sufficiently flexible to absorb shock, but rigid enough to resume its shape and position and not be subject to permanent distortion. The phenol condensation product mentioned has proven satisfactory for the desired purpose but it is apparent that other material having similar characteristics may be used in this capacity.

The shock caused by the transmission of power from the shaft plug 1 to the hub 4 is effectively taken care of by means of the splines 3 and 5 being embedded in the resilient member 2.

The provision of the internally screw-threaded hub makes it possible to replace or interchange the propeller blades which are adapted to be screwed into the hub extensions and locked therein by suitable retaining means such as bolts and the like.

The shaft plug 1 is screw-threaded at 14 to receive a locking nut 11 and also at 15 to receive a locking nut 12 provided with a washer 13. A retaining nut 16 is screwed onto the reduced threaded portion of the engine shaft 18 for the purpose of holding the hub on the engine shaft. A locking nut 17 is screwed into shaft plug 1 and abuts against the shoulder 19 of the hub-retaining nut 16 for the purpose of locking same in position. Suitable safety wires 20 and 21 are provided for a purpose which will be readily understood by reference to the drawings. In Figure 3 is illustrated a modification of the device, the differentiation consisting in the use of compression coil springs in place of and for the same purpose as the phenol condensation product resilient shock absorbing means. In this embodiment a hub 22 is provided with a plurality of of integral splines 23 while the shaft plug 24 has a plurality of integral splines 25. A series of compression coil springs 26 is placed between each spline 23 and its adjacent spline 25. It will be readily seen that the same action takes place as in the previously described mechanism, this embodiment merely consisting in the substitution of compression coil springs for resilient shock absorbing phenol condensation product described.

It will be seen by reference to the foregoing description and illustrations that a simple and effective design has been provided for applying a resilient means for revolving the propeller and absorbing or resisting the inertia forces of the engine. However, it is readily realized that a suitable flexible means other than those described hereinbefore may be placed in the propeller hub in such a manner as to give the same results, and it is therefore not desired to limit ourselves to the specific design heretofore submitted, but to claim broadly the principle of applying a resilient means for accomplishing the above described results.

Having thus described our invention, we claim:

1. In an aircraft propeller, resilient means for revolving said propeller.

2. An aerial propeller having a hub and a plurality of blades, said propeller being provided with resilient means for absorbing and resisting the unbalanced inertia forces of the shaft from a suitable prime mover for revolving said propeller.

3. An aerial propeller having a hub and a plurality of blades, means for revolving said hub and blades, and means for absorbing or resisting the inertia forces of the shaft from a suitable prime mover for revolving said propeller, said means being arranged between said prime mover and said hub and blades.

4. An aerial propeller having a hub and a plurality of blades, means for revolving said hub and blades, and means for absorbing or resisting the inertia forces of the shaft from a suitable prime mover for revolving said propeller, said means being arranged between said prime mover and said hub and blades, means for revolving said hub, said last named means consisting of a plurality of splines on the inner side of said hub, said splines being adapted to intermesh with said intermediate resilient member.

5. An aerial propeller having a hub and a plurality of blades, means for revolving said hub and blades, and means for absorbing or resisting the inertia forces of the shaft from a suitable prime mover for revolving said propeller, said means being arranged between said prime mover and said hub and blades, said absorbing means consisting in an intermediate resilient member formed of a phenol condensation product.

6. An aerial propeller having a hub and a plurality of blades, said hub and blades being revolved by a resilient member adapted to absorb and resist the inertia forces of the shaft of a suitable prime mover for revolving said propeller blades, and means for revolving said resilient member.

7. An aerial propeller having a hub and a plurality of blades, said hub and blades being revolved by a resilient member adapted to absorb and resist the inertia forces of the shaft of a suitable prime mover for revolving said propeller blades, and means for revolving said resilient member, said last named means consisting of a shaft plug provided with a plurality of splines adapted to revolve said resilient member.

8. An aerial propeller having a hub and a plurality of detachable blades, said propeller being provided with resilient means for absorbing and resisting the unbalanced inertia forces and means for interchanging said detachable blades.

9. An aerial propeller having a hub and a plurality of detachable blades, said propeller being provided with resilient means for absorbing and resisting the unbalanced inertia forces and means for interchanging said detachable blades, said last named means consisting of a threaded portion formed on the end of said blade and the inner side of said hub, said blade being screwed into, and adjustably mounted and locked in said hub.

10. An aerial propeller having a hub and a plurality of detachable blades, said propeller being provided with resilient means for absorbing and resisting the unbalanced inertia forces exerted on said propeller, and means for balancing said blades.

11. An aerial propeller having a hub and a plurality of detachable blades, said propeller being provided with resilient means for absorbing and resisting the unbalanced inertia forces exerted on said propeller, and means for balancing said blades, said balancing means consisting of blades being adapted to be screwed into or out of said hub and adjustably mounted in angular position relative to each other and likewise correcting the balance of said blades.

In testimony whereof we affix our signatures.

FRANK W. CALDWELL.
ERNEST G. McCAULEY.